(12) United States Patent
Baker et al.

(10) Patent No.: US 7,866,896 B2
(45) Date of Patent: Jan. 11, 2011

(54) ELECTRICAL TO OPTICAL AND OPTICAL TO ELECTRICAL CONNECTOR SYSTEM

(75) Inventors: Eugene E. Baker, Somis, CA (US); David C. Pelletier, Southbridge, MA (US); Joseph Curini, Worcester, MA (US)

(73) Assignee: Telecast Fiber Systems, Inc., Worcester, MA (US)

(*) Notice: Subject to any disclaimer, the term of this patent is extended or adjusted under 35 U.S.C. 154(b) by 144 days.

(21) Appl. No.: 12/206,125

(22) Filed: Sep. 8, 2008

(65) Prior Publication Data

US 2009/0067788 A1 Mar. 12, 2009

Related U.S. Application Data

(60) Provisional application No. 60/970,525, filed on Sep. 6, 2007.

(51) Int. Cl.
*G02B 6/36* (2006.01)
(52) U.S. Cl. .............. 385/88; 385/53; 385/92
(58) Field of Classification Search .......... 385/53, 385/88, 92
See application file for complete search history.

(56) References Cited

U.S. PATENT DOCUMENTS

| 4,773,878 | A | 9/1988 | Hansell, III |
| 4,944,568 | A | 7/1990 | Danbach et al. |
| 5,908,322 | A | 6/1999 | Seki |
| 6,478,625 | B2 | 11/2002 | Tolmie et al. |
| 6,702,620 | B2 * | 3/2004 | Lynch et al. ............... 439/638 |
| 6,935,882 | B2 | 8/2005 | Hanley et al. |
| 7,215,554 | B2 | 5/2007 | Torres et al. |
| 7,223,023 | B2 | 5/2007 | Killer et al. |
| 7,245,498 | B2 | 7/2007 | Togami et al. |
| 7,272,274 | B1 | 9/2007 | Albers et al. |
| 7,316,509 | B2 | 1/2008 | Posamentier |
| 7,347,634 | B2 | 3/2008 | Gunther et al. |
| 7,393,147 | B1 | 7/2008 | Rollinger |
| 2005/0135755 | A1 | 6/2005 | Kiani et al. |

OTHER PUBLICATIONS

International Search Report mailed Nov. 21, 2008, in corresponding PCT Application No. PCT/US2008/075559; International Filing Date: Sep. 8, 2008; First Named Inventor: Eugene Baker.

* cited by examiner

*Primary Examiner*—Jennifer Doan
(74) *Attorney, Agent, or Firm*—Brian M. Dingman; Mirick, O'Connell, DeMallie & Lougee, LLP

(57) ABSTRACT

A connector module for interfacing electrical or optical connectors to electrical systems such as an audio/visual signal processing board. The module includes a housing defining at least first and second faces, at least the second face being less than about one square inch in area. There is a first electrical or optical connector at the first face, and a second electrical connector at the second face, in which the second electrical connector is a pin connector.

18 Claims, 7 Drawing Sheets

ELECTRICAL TO OPTICAL AND OPTICAL TO ELECTRICAL CONNECTOR SYSTEM

CROSS REFERENCE TO RELATED APPLICATION

This application claims priority of Provisional Patent Application Ser. No. 60/970,525 filed on Sep. 6, 2007, the disclosure of which is incorporated herein by reference.

FIELD OF THE INVENTION

The invention relates to an electrical to optical and optical to electrical connector system.

SUMMARY OF THE INVENTION

This invention features a system with one or more electrical to optical connectors, and/or one or more optical to electrical connectors. The connectors can be electrically and mechanically coupled to a backplane board that is itself adapted to be coupled to a chassis carrying video/audio switching and/or processing boards, such as the openGear DFR-8310 2RU frame available from openGear, Inc. of Sandy, Utah. The openGear product typically can accommodate up to 10 printed circuit boards (PCBs). Each such internal PCB is designed to be coupled to up to 10 electrical coax cables through ten BNC coax connectors held on a rear module (i.e., a backplane board) that is coupled to the PCB at the back of the chassis through standard gold-fingered card edge connectors on the PCB that fit into a pin-type card-edge connector on the backplane. The PCBs process electrical audio/visual signals.

A preferred embodiment of the inventive connection system comprises one or more cube-shaped housings. The housings may carry a fiber optic connector on one side (e.g., an ST-type connector or one of various other standard fiber optic connectors). The housings carry a pin connector on another side of the housing. The pin connector is adapted to be electrically coupled to a PCB or the like, e.g., a backplane board, such that the housings are electrically coupled to the backplane through a four-pin connector.

The invention includes an optical transmitter module that takes electrical signals from the PCB in the chassis, and transmits optical signals through a standard optical connector, thus accomplishing electrical to optical conversion. Electronics within the housing take in electrical signals passed from a PCB to which the backplane is connected, through the backplane board, into the cube-shaped housing, and create an optical signal. This optical signal is coupled into a fiber that is itself coupled to the optical connector attached to the housing.

The invention also includes a receiver module that receives an optical signal through a standard optical connector and creates an electrical signal, thus accomplishing optical to electrical conversion. Electronics within the housing take in an optical signal and create an electrical signal that is then coupled into a PCB through the backplane board.

The invention also contemplates placing standard coax-type processing electronics in the same cube-shaped housings that are identical to the optical housings, so that standard coax signals can also be coupled through the backplane if desired, to accomplish electrical to electrical interfacing. The invention further contemplates twisted pair conductors as an alternate to coax media to interface with.

Each of these modules comprises a generally cube-shaped housing that is sized with such that it occupies about one-eighth of the backplane board, so that up to eight such modules can be coupled to the backplane, thus electrically coupling the modules to the PCB to which the backplane is connected. This may be accomplished with a face area of less than about one square inch, and preferably less than about 0.5 square inches. When the backplane is coupled to an electrical audio/visual processing PCB, the backplane and modules with their internal circuitry act as a means to couple optical signals and/or electrical signals, as desired, into and/or out of a chassis of the type that includes one or more PCBs that process electrical audio/visual signals. As the various types of housings are all the same size, shape and footprint, and are each coupled to the backplane through identical electrical connectors, they can be mixed and matched as desired to achieve up to eight BNC-type electrical and/or optical connections into and out of a processing PCB. The BNC and ST are non-limiting examples of available connectors commonly used for coaxial and fiber optic media respectively. Other electrical or optical connectors are available that can attach coax, optical cable or twisted pair media or the like to these modules, such as an RJ-45 interface or an LC connector.

In another non-limiting embodiment, the modules can be mounted to PCBs that function not as a backplane, but as an interface for signals to and from electronic equipment.

In yet another non-limiting embodiment, the invention features an interface device to which two or possibly more of the modules can be electrically coupled through their pin connectors. The interface device supplies power to the modules that are coupled to it. The interface device provides a cross connection between the output signals of one module and the input signals of the other module attached to the same interface.

In another non-limiting embodiment, the faces of the modules that are coupled to inputs and outputs are at 90 degree angles rather than parallel. Such right angle versions can be used for both BCN and ST media converter modules.

In yet another non-limiting embodiment, the modules can have more than one signal path to or from them (i.e., more than one input and/or more than one output). These multiple inputs and/or outputs can be on one or more faces of the housing.

This invention features a connector module for interfacing electrical or optical connectors to electrical systems, comprising a housing defining at least first and second faces, at least the second face being less than about one square inch in area, a first electrical or optical connector at the first face, and a second electrical connector at the second face, in which the second electrical connector is a pin connector. The first connector may be an optical connector. In this case, the connector module may further comprise circuitry for translating an incoming optical signal to an outgoing electrical signal, or circuitry for translating an incoming electrical signal to an outgoing optical signal. The first connector may be an electrical connector. In this case, the connector module may further comprise circuitry for translating an incoming electrical signal to an outgoing electrical signal. In one embodiment, the first and second faces are each less than about 0.5 square inches in area, and the housing has a generally rectangular parallelepiped shape, such that the housing is almost cube-shaped.

The connector module may further comprise an electrical backplane to which the second electrical connector is coupled. The backplane may have two faces, in which case the second electrical connector can be coupled to one face of the backplane, with the other face of the backplane coupled to an electrical audio/visual signal processing board. In another embodiment, the second electrical connector may be coupled directly to an electrical audio/visual signal processing board, without the use of an intervening backplane.

The first and second faces of the module may be on opposite ends of the housing and essentially parallel to one another. In another embodiment, the first and second faces are adjacent to one another and are at essentially at 90 degrees to one another. The housing may define a third face that is less than about one square inch in area, and the module may in this case further comprise a third electrical or optical connector at the third face. The invention also features a powered connector module interface device for providing power to and electrically and physically interfacing at least two of the connector modules described herein.

BRIEF DESCRIPTION OF THE DRAWINGS

Other objects, features and advantages will occur to those skilled in the art from the following description of embodiments of the invention, and the accompanying drawings, in which.

DETAILED DESCRIPTION OF EMBODIMENTS OF THE INVENTION

Figure 1A:
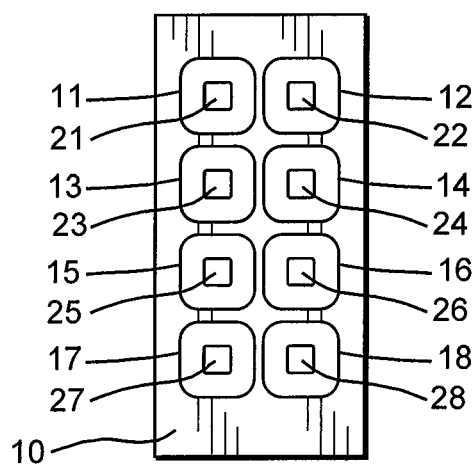
FIG. 1A is a top view and FIG. 1B a side view of a backplane carrying eight modules of the invention.
Figure 1B:
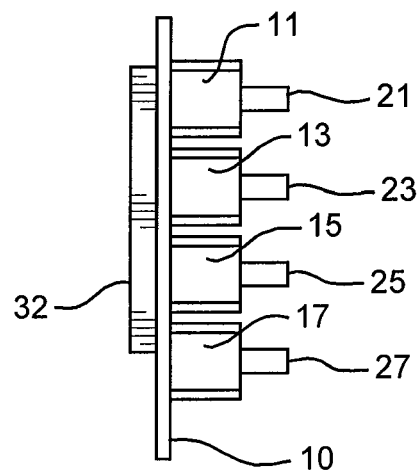
FIG. 1C is an exploded view of the backplane of FIGS. 1A and 1B being inserted into the edge connectors of an audio/visual signal processing board.
Figure 1C:
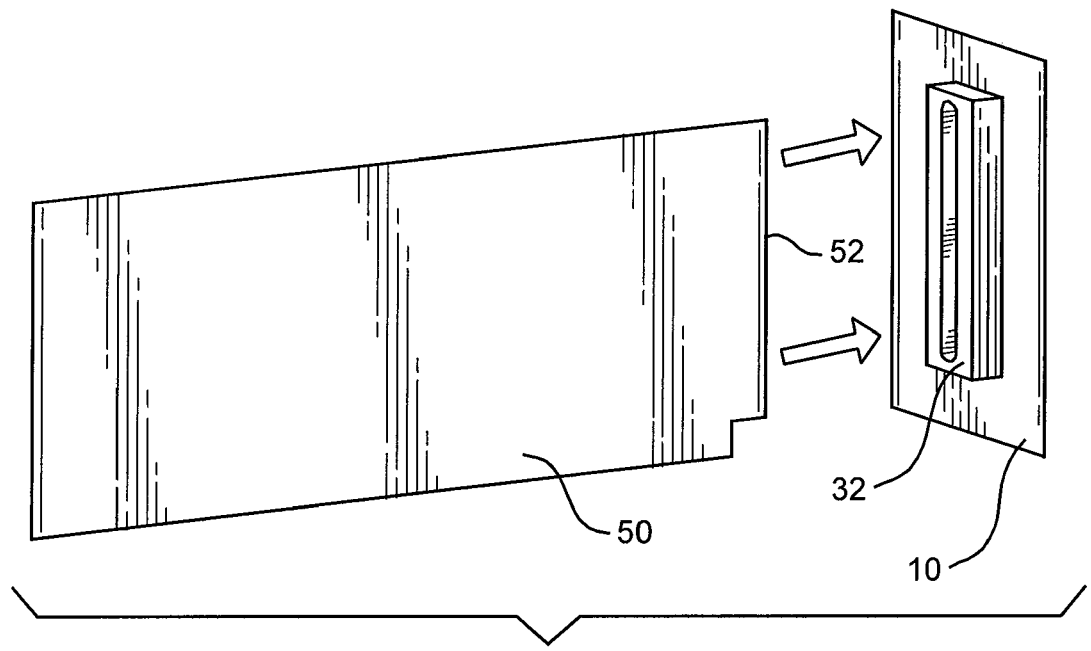

Backplane 10, FIGS. 1A-1C and FIG. 2, includes on its back face connector 32 that is adapted to electrically couple to edge connector 52 of electrical audio/visual processing board 50. The front face of backplane 10 is adapted to electrically couple to up to eight inventive modules 11-18. Each module 11-18 either transmits or receives electrical or optical signals that are being received by or sent by circuitry on PCB 50. Modules 11-18 each include one electrical or optical connector 21-28, respectively, on one face (in this example, the face directly opposite board 10). Each module includes an electrical connector on another face, as explained below. The modules can include more than one connector on any one face and/or connectors on more than two faces.

Figure 2:
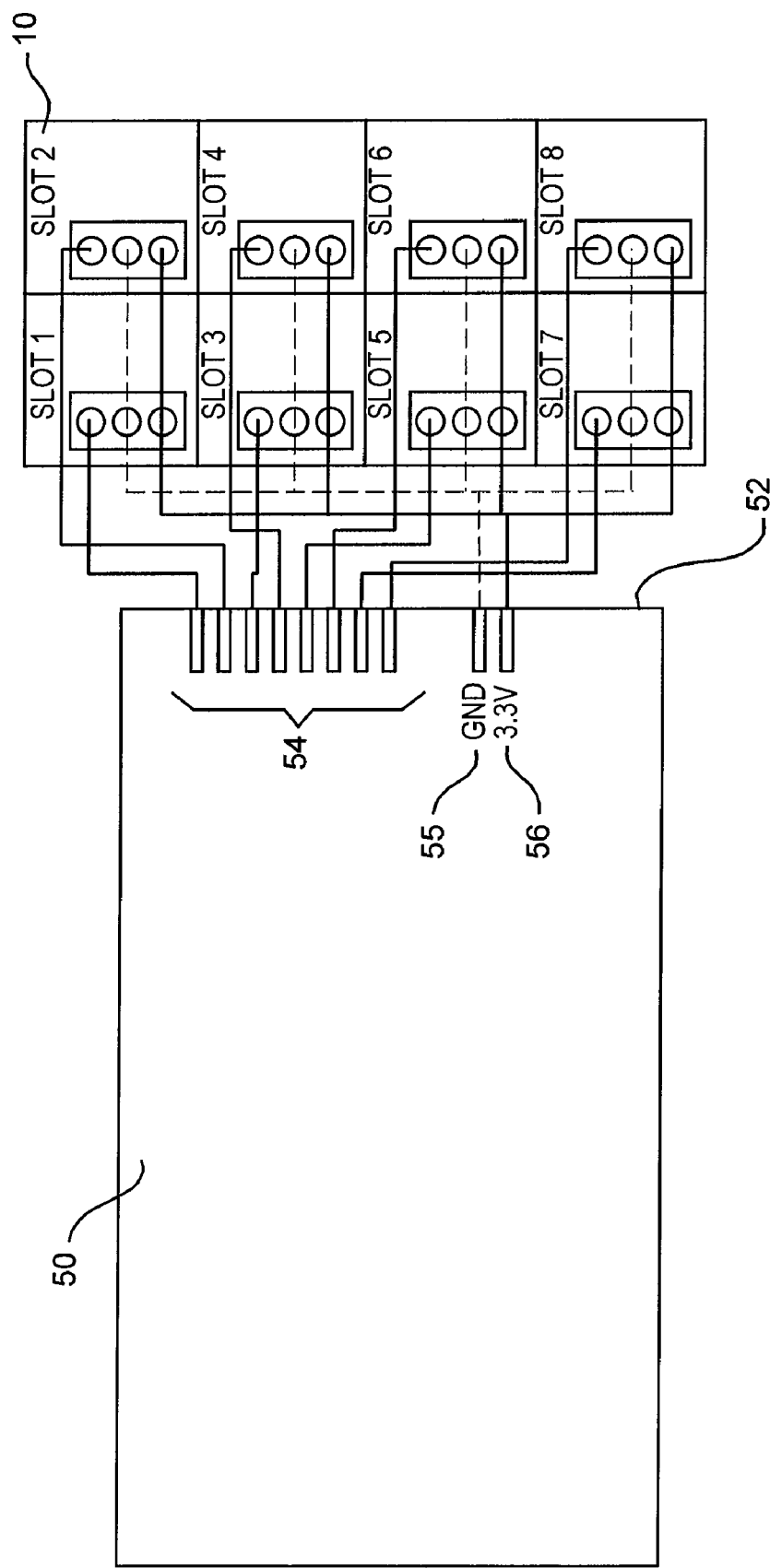
FIG. 2 is a schematic diagram of the electrical connections between the signal processing board and the modules of FIG. 1C.

Board 10 is designed to include eight pin-type electrical connectors (termed slots 1-8 in FIG. 2). Each of these connectors is adapted to physically and electrically mate with the electrical connector on a face of a module 11-18. In an embodiment, these connectors are four-pin connectors. One pin of each connector is electrically coupled to ground 55, and another is electrically coupled to 3.3V source 56. The other two pins (or in some cases only one) are the input/output pins that are coupled to input/output connectors 54 on audio/visual processing PCBs.

Figure 3:
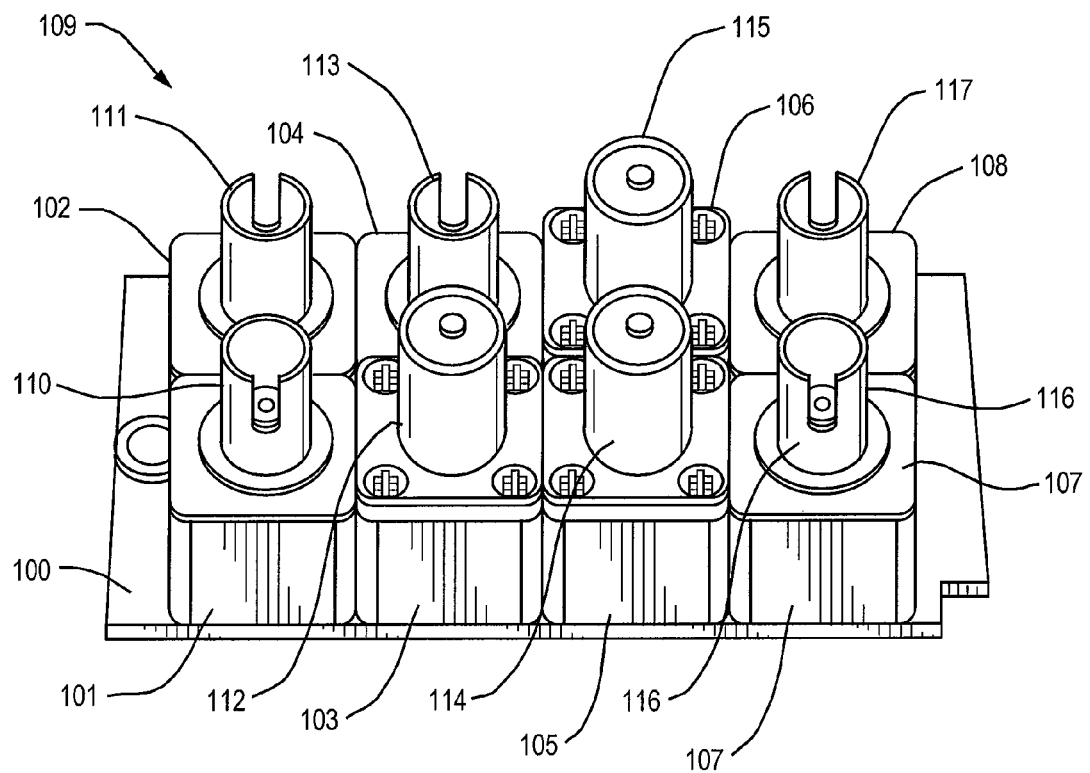
FIG. 3 is a more detailed perspective view of one arrangement of eight inventive modules on a backplane.

As shown in FIG. 3, each of modules 101-108 mounted to backplane 100 presents an outward facing electrical or optical connector (labeled 110-117, respectively) of a type known in the art. This allows standard electrical and optical audio/visual input and output lines to be coupled to PCB 50 through assembly 109.

Figure 4:
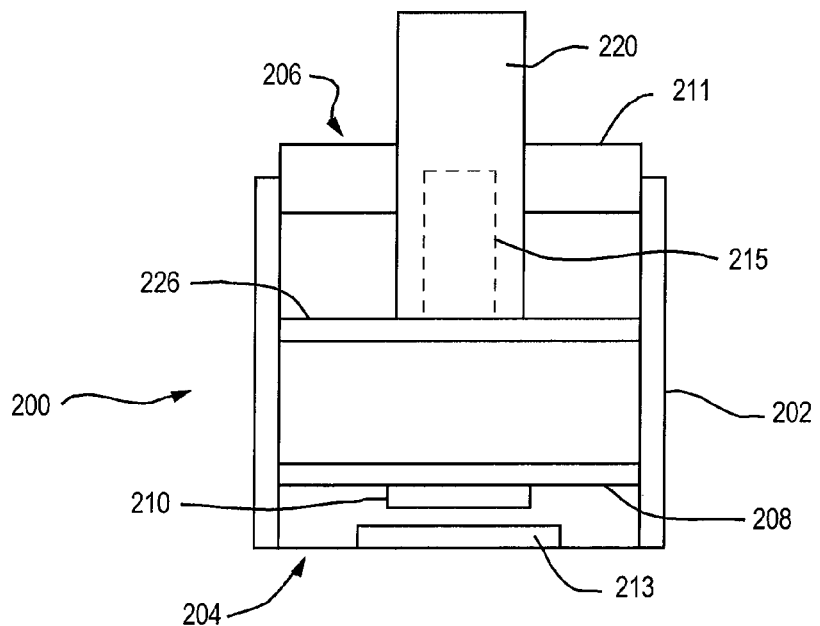
FIG. 4 is a schematic cross-sectional diagram of an inventive module.

Inventive module 200 is shown in FIG. 4 and includes generally cube-shaped housing 202 that defines first face 204 and opposite second face that can each be about 0.668 by 0.650 inches (thus presenting a face defining an area of about 0.43 square inches); this allows eight of modules 200 to fit onto the face of a backplane (such as backplane 100, FIG. 3) of the type that typically holds 10 BNC connectors such as is standard on the openGear frame described above. The invention thus allows for electrical and/or optical inputs and/or outputs to and/or from the processing PCB using the standard PCB edge connection design and the standard backplane footprint.

Housing 202 may be about 0.6 inches high. Module 200 may be about 1.23 to 1.345 inches high including the projecting connector sleeve 220 (this would be an existing electrical or optical conductor, such as the type disclosed herein; a generic representation of such is shown in the drawing) that is mechanically coupled to clamp bracket 211. When used as a receiver, internal PCB 226 electrically or optically terminates the electrical or optical connector (not shown) that is coupled to connector sleeve 220. When used as an optical transmitter, optical transmitter 215 is included. PCB 226 provides equalization of electrical signals and electrical to optical signal conversion, as appropriate. Second internal PCB 208 is electrically coupled to PCB 226 and adapts power and signals to the backplane or from PCB 226, and controls the optical power circuit, as appropriate depending on whether the module is an electrical or optical transmit or receive module. Four-pin electrical connector 210, carried on the underside of internal PCB 208, receives DC power and electrically couples module 200 to the mating connector on backplane 10 (or to a mating pin connector of a processing PCB, as explained below). Hold-down bracket 213 mechanically couples module 200 to the backplane or other PCB, using a mating mechanical structure on the backplane (not shown).

Figure 5:
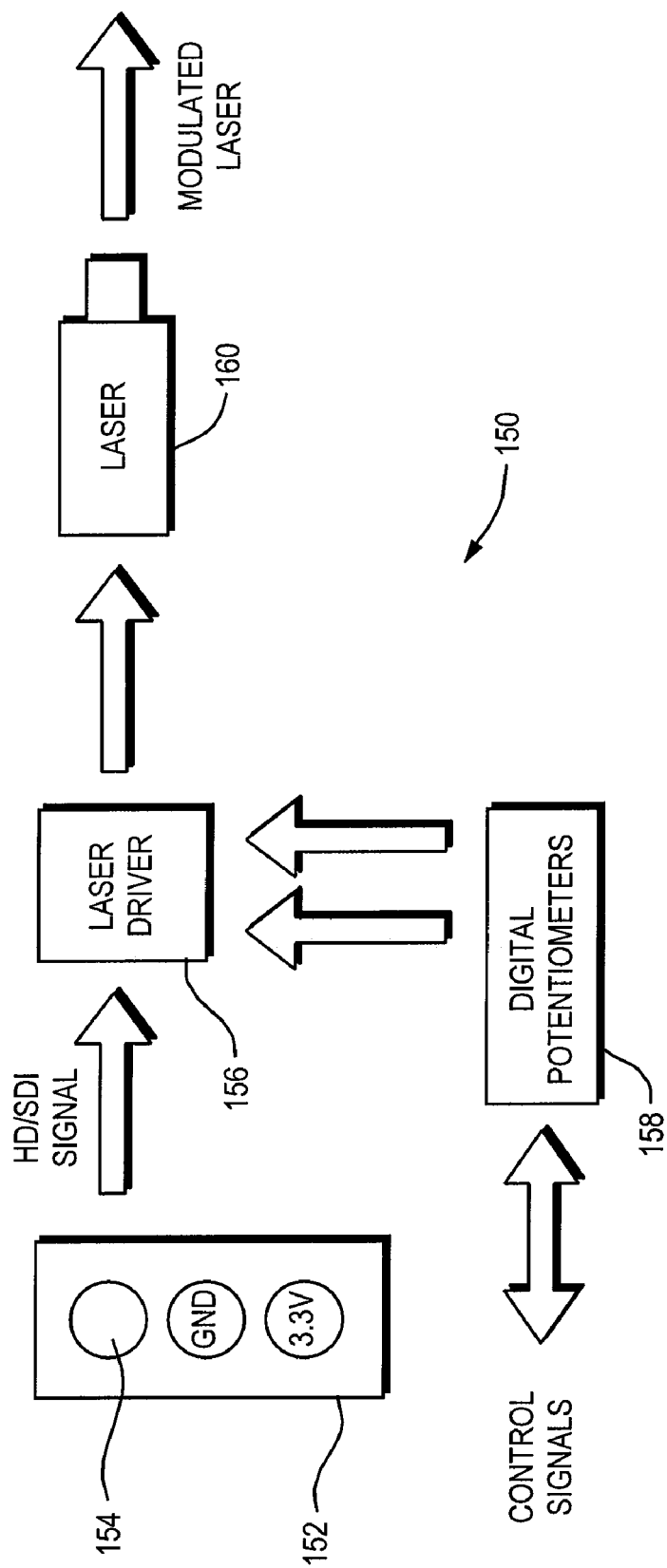
FIG. 5 is a schematic block diagram of an optical transmitter module of the invention.

An optical transmit module 150 is functionally depicted in FIG. 5. Electrical connector 152 includes data pin(s) 154 and provides HD or SDI signals, for example, to laser driver 156. Digital potentiometers 158, under control of signals provided by a microprocessor (not shown), provide bias and modulation control of laser 160. The output is coupled to a standard optical connector such as shown in FIG. 3.

Figure 6:
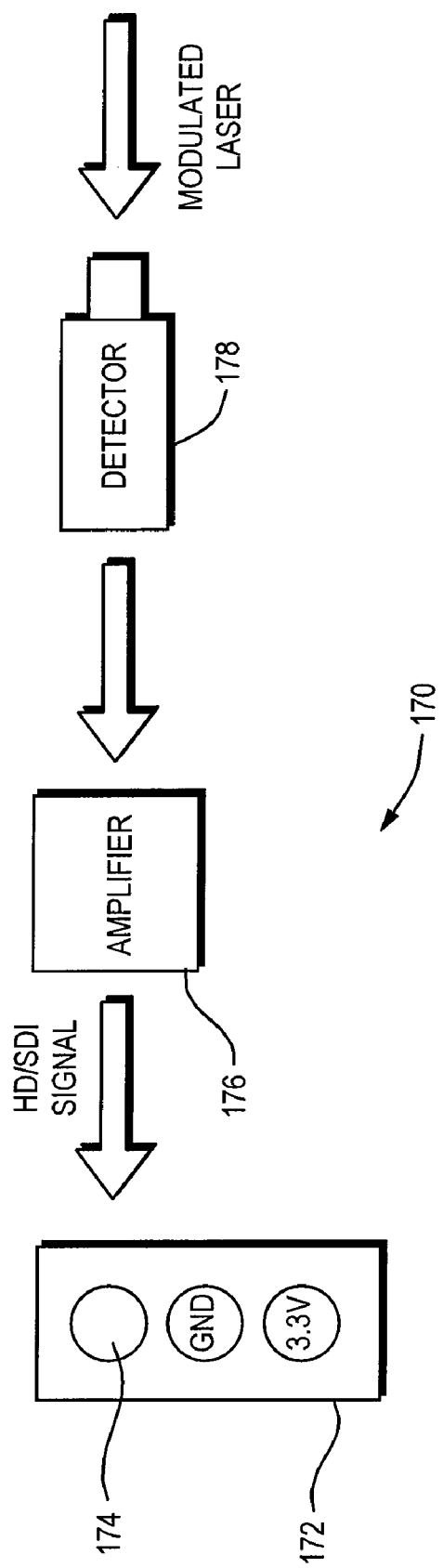
FIG. 6 is a schematic block diagram of an optical receiver module of the invention.

An optical receiver module 170 is functionally depicted in FIG. 6. Input signals are detected and converted to electrical signals by detector 178. These are then amplified by amplifier 176 and passed to the processing PCB through connector 172 that includes data pin(s) 174.

Figure 7:
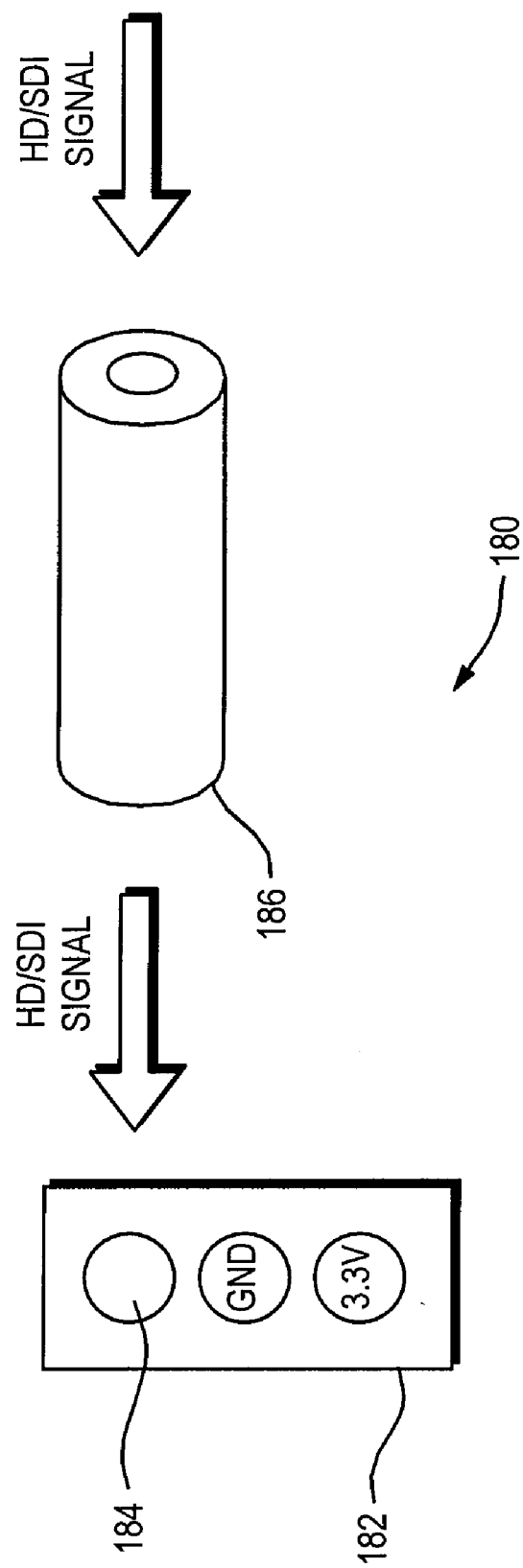
FIG. 7 is a schematic block diagram of an electrical receiver or transmitter module of the invention.

A pass-through BNC electrical input or output module 180 is functionally depicted in FIG. 7. BNC connector 186 is electrically coupled to the pins of connector 182, including data pin(s) 184. Module 180 can include any necessary processing so as to translate or repeat the incoming signals, for example.

Figure 8:
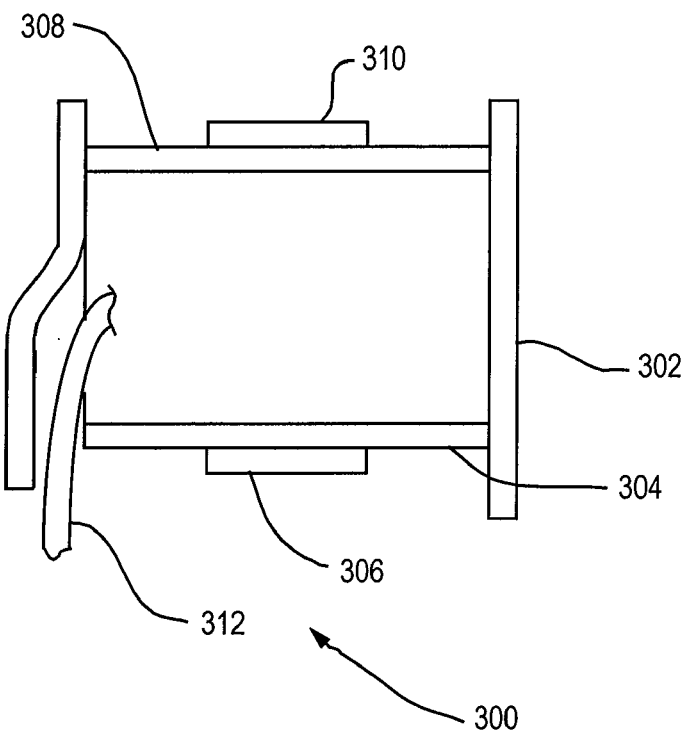
FIG. 8 is a schematic cross-sectional diagram of an inventive interface device for modules of the invention.
Figure 9:
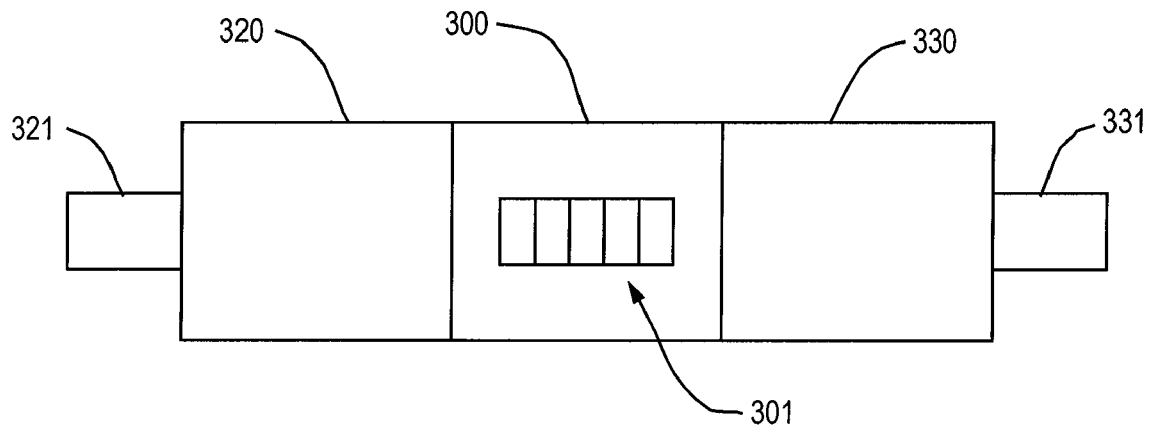
FIG. 9 is a side view of the interface device of FIG. 8 with two inventive modules coupled to it.

Connector module interface device 300 is shown in FIGS. 8 and 9. Device 300 allows two of the inventive modules described above to be electrically interconnected to accomplish transfer of signals between them. With the use of the modules described above, this allows the creation of at least:

an optical to electrical converter, an electrical to optical converter, an electrical repeater, an optical wavelength shifter, and an optical repeater. Power is supplied to device 300 through power cord 312. Housing 302 includes internal PCB 304 that carries electrical connector 306, and internal PCB 308 that carries electrical connector 310. Electrical connectors 306 and 310 are adapted to physically and electrically mate with the electrical connector 210 of an inventive module 200. Device 300 also mechanisms or features that physically couple with the hold-down brackets of the connected modules, to mechanically couple the modules to device 300. Thus, two modules 200 can be electrically and physically coupled to device 300.

FIG. 9 depicts device 300 mated to inventive module 320 with protruding optical or electrical connector 321, and module 330 with protruding optical or electrical connector 331. Device 300 provides power through two of the four connector pins, and passes signals between the other pins of the connectors of the two interconnected inventive modules; device 300 may include other processing as desired, for example to translate or repeat the signals. Device 300 may also be adapted to measure the power used in a standard fashion, for example to determine when the device is in use. LED display 301 can be included to visually indicate the power level.

Although specific features of the invention are shown in some figures and not others, this is for convenience only, as some features may be combined with any or all of the other features in accordance with the invention.

Recitation of sizes, quantities, weights and ranges of values herein are merely intended to serve as a shorthand method of referring individually to each separate value falling within the range, unless otherwise indicated herein, and each separate value is incorporated into the specification as if it were individually recited herein.

The use of any and all examples, or exemplary language (e.g., "such as") provided herein, is intended merely to better illustrate the invention and does not pose a limitation on the scope of the invention.

A variety of modifications to the embodiments described herein will be apparent to those skilled in the art from the disclosure provided herein. Thus, the invention may be embodied in other specific forms without departing from the spirit or essential attributes thereof.

What is claimed is:

1. An assembly comprising:
   a backplane having a back face comprising a PCB edge connector and an opposing front face comprising a plurality of pin-type electrical connectors, where the PCB edge connector is electrically coupled to each of the plurality of pin-type electrical connectors;
   a plurality of connector modules, each connector module adapted to physically and electrically couple to one of the plurality of pin-type electrical connectors, each connector module comprising:
   a housing defining at least opposing first and second faces,
   a first electrical or optical connector at the first face; and
   a second electrical connector at the second face, in which the second electrical connector is a pin connector, where the pin connector is adapted to physically and electrically couple to one of the pin-type electrical connectors on the backplane, and the second electrical connector is electrically coupled to the first electrical or optical connector;
   where each housing is sized such that it occupies approximately one-eighth of the area of the front face of the backplane when the connector module is coupled to the backplane.

2. The assembly of claim 1 in which the first connector of at least one connector module is an optical connector.

3. The assembly of claim 2, where the at least one connector module further comprises circuitry for translating an incoming optical signal to an outgoing electrical signal.

4. The assembly of claim 2, where the at least one connector module further comprises circuitry for translating an incoming electrical signal to an outgoing optical signal.

5. The assembly of claim 1 in which the first connector of at least one connector module is an electrical connector.

6. The assembly of claim 5, where the at least one connector module further comprises circuitry for translating an incoming electrical signal to an outgoing electrical signal.

7. The assembly of claim 1 further comprising an electrical audio/visual signal processing board adapted to electrically and physically couple to the PCB edge connector.

8. The assembly of claim 1 in which the housing of at least one of the connector modules defines a third face that is less than about one square inch in area, and further comprising a third electrical or optical connector at the third face.

9. The assembly of claim 1 in which the first and second faces of at least one of the connector modules are each less than about 0.5 square inches in area.

10. The connector module of claim 9 in which the housing of the at least one connector module has a generally rectangular parallelepiped shape.

11. An assembly, comprising:
    a pair of connector modules, each connector module comprising a module housing defining at least opposing first and second faces, a first electrical or optical module connector at the first face, and a second electrical module connector at the second face, where the first module connector is electrically coupled to the second module connector;
    a connector module interface device comprising a connector module interface housing defining at least opposing first and second faces and a connector module interface device electrical connector at each of the first and second faces, where the connector module interface device electrical connectors are electrically coupled; and
    where each of the connector module interface device electrical connectors is adapted to physically and electrically mate with the second electrical module connectors of the pair of connector modules to electrically interconnect the pair of connector modules and enable transfer of signals between the pair connector modules.

12. An assembly comprising:
    a backplane having a back face comprising a PCB edge connector and an opposing front face comprising a plurality of pin-type electrical connectors, where the PCB edge connector is electrically coupled to each of the plurality of pin-type electrical connectors; and
    a plurality of connector modules, each connector module adapted to physically and electrically couple to one of the plurality of pin-type electrical connectors, each connector module comprising:
    a housing defining at least opposing first and second faces, where each housing is sized such that it occupies approximately one-eighth of the area of the front face of the backplane when the connector module is coupled to the backplane,
    a first electrical or optical connector at the first face;
    a first printed circuit board (PCB) physically and electrically coupled to the first electrical or optical connector, where the first PCB is adapted to provide equalization of electrical signals or electrical to optical signal conversion;

a second electrical connector at the second face, in which the second electrical connector is a pin connector, where the pin connector is adapted to physically and electrically couple to one of the pin-type electrical connectors on the backplane; and a second PCB electrically coupled to the first PCB and physically and electrically coupled to the second electrical connector, where the second PCB adapts power and signals to the back plane or from the first PCB.

13. The assembly of claim 12, in which the first connector on at least one of the connector modules is an optical connector.

14. The assembly of claim 13, where the first PCB optically terminates the first connector when the at least one connector module is used as a receiver.

15. The assembly of claim 13, further comprising an optical transmitter when the at least one connector module is used as a transmitter.

16. The assembly of claim 12, in which the first connector on at least one of the connector modules is an electrical connector.

17. The assembly of claim 16, where the first PCB electrically terminates the first connector when the at least one connector module is used as a receiver.

18. The assembly of claim 11, further comprising a power cord that supplies power to the connector module interface device, and where the connector module interface device passes power to the pair of connector modules to which it is mated.

* * * * *